(12) United States Patent
Sun

(10) Patent No.: US 7,365,994 B2
(45) Date of Patent: Apr. 29, 2008

(54) BRACKET FOR EXPANSION CARD SLOT

(75) Inventor: Zheng-Heng Sun, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 132 days.

(21) Appl. No.: 11/344,461

(22) Filed: Jan. 30, 2006

(65) Prior Publication Data
US 2006/0291181 A1 Dec. 28, 2006

(30) Foreign Application Priority Data
Jun. 28, 2005 (CN) .................. 2005 2 0060821 U

(51) Int. Cl.
*H05K 7/14* (2006.01)
(52) U.S. Cl. .................. 361/825; 361/796; 361/752; 361/683; 361/759; 361/801
(58) Field of Classification Search ............ 361/801, 361/683, 802, 807, 752, 796, 825, 726, 740, 361/747, 759
See application file for complete search history.

(56) References Cited

U.S. PATENT DOCUMENTS

| | | | | |
|---|---|---|---|---|
| 5,986,892 A * | 11/1999 | Hargy, III | .................. | 361/759 |
| 6,137,689 A * | 10/2000 | Schechtel et al. | ............ | 361/759 |
| 6,239,979 B1 * | 5/2001 | Ruff | .................. | 361/759 |
| 6,309,037 B2 * | 10/2001 | Bertolami | ................. | 312/223.2 |
| 6,375,495 B1 * | 4/2002 | Szeto | .................. | 439/540.1 |
| 6,396,705 B2 * | 5/2002 | Ruff | .................. | 361/759 |
| 6,412,749 B1 * | 7/2002 | Supinski et al. | ............ | 248/674 |
| 6,424,521 B1 * | 7/2002 | Vega et al. | ................. | 361/683 |
| 6,556,452 B2 * | 4/2003 | Ruff | .................. | 361/759 |
| 6,659,796 B1 * | 12/2003 | Waddell et al. | ............. | 439/557 |
| 6,822,877 B2 * | 11/2004 | Chen | ................... | 361/759 |
| 6,831,840 B2 * | 12/2004 | Ruff | .................. | 361/759 |
| 7,214,888 B1 * | 5/2007 | Feroli et al. | ................ | 174/365 |

FOREIGN PATENT DOCUMENTS

TW M260768 7/2004

* cited by examiner

*Primary Examiner*—Jeremy C. Norris
*Assistant Examiner*—Dameon E Levi
(74) *Attorney, Agent, or Firm*—Morris Manning Martin LLP; Tim Tingkang Xia, Esq.

(57) ABSTRACT

A bracket for an expansion card slot in a rear panel of a computer enclosure includes a main portion, a securing portion, and a connecting portion. The main portion includes an inserting portion formed from one end thereof, a securing portion perpendicularly outwardly bent from another end of the main portion. The securing portion defines a notch therein. The connecting portion recesses inwardly from the main portion, and includes a latching opening and a locating hole. The locating hole and the latching opening cooperatively define a shape that is similar with the connector, for allowing the connector to extend therethrough and then offset to engage with the connecting portion. In assembly the bracket to the rear panel, the inserting portion and the securing potion are engaged on the bracket. The connector can be readily installed or removed to or from the bracket.

11 Claims, 3 Drawing Sheets

BRACKET FOR EXPANSION CARD SLOT

BACKGROUND OF THE INVENTION

1. Field of the Invention

The present invention relates to a bracket for an expansion card slot in a computer enclosure, and particularly to a bracket that allows convenient installation or removal of a connector of an expansion card to or from the bracket.

2. General Background

In order to upgrade operating capabilities of a personal computer, a plurality of expansion cards is operatively installed in a computer enclosure of the personal computer. Typical types of expansion cards include network cards, sound cards, graphics accelerator cards, and multi-media cards and so on. The computer enclosure generally defines a plurality of expansion card slots in a rear panel thereof, in order to install those expansion cards.

A conventional bracket for an expansion card slot includes a rectangular opening and a plurality of threaded holes. A connector of an expansion card runs through the opening and is secured on the bracket by screws locking into the threaded holes. However, these screws are small enough to make them difficult to be manipulated and installed. It is laborious and time-consuming to manually manipulate the screws. Additionally, because of their small size, the screws are easier to be dropped by an assembler into the computer. Some accidental damage will occur in the computer due to impact of these moving parts, and the like causes. Meanwhile, these screws are installed to protrude beside the interface of the connector outside the bracket, and it is possible to interfere any further connection activities around the bracket due to these screws.

What is needed is to provide a bracket that allows convenient installation or removal of a connector of an expansion card to or from the bracket.

SUMMARY

An exemplary bracket for an expansion card slot in a rear panel of a computer enclosure includes a main portion, a securing portion, and a connecting portion. The main portion includes an inserting portion formed from one end thereof, a securing portion perpendicularly outwardly bent from another end of the main portion. The securing portion defines a notch therein. The connecting portion recesses inwardly from the main portion, and includes a latching opening and a locating hole. The locating hole and the latching opening cooperatively define a shape that is similar with the connector, for allowing the connector to extend therethrough and then offset to engage with the connecting portion. In assembly the bracket to the rear panel, the inserting portion and the securing potion are engaged on the bracket. The connector can be readily installed or removed to or from the bracket.

Other advantages and novel features of the invention will become more apparent from the following detailed description when taken in conjunction with the accompanying drawings, in which:

DETAILED DESCRIPTION OF THE EMBODIMENT

Figure 1:
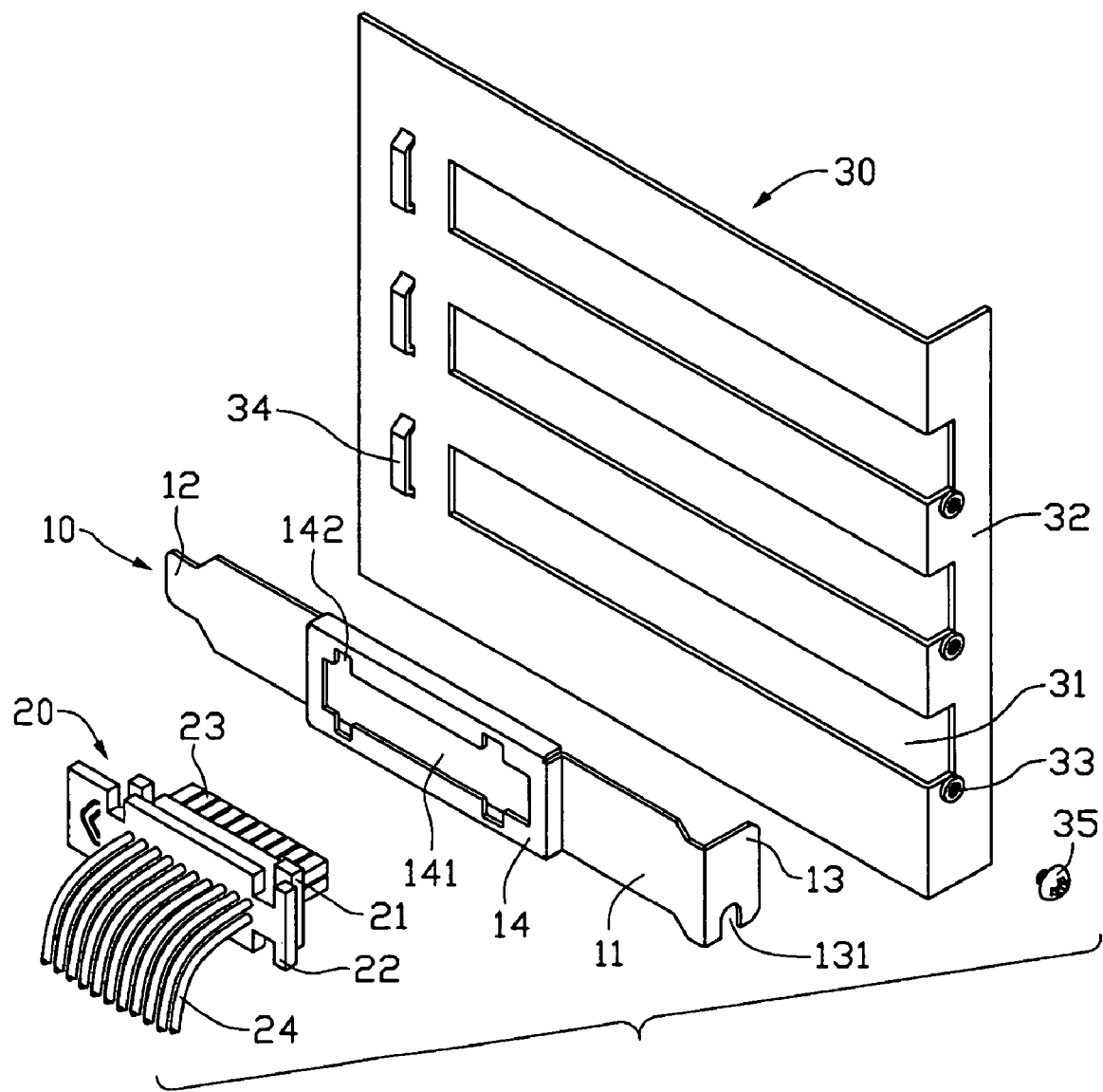
FIG. 1 is an exploded, isometric view of a bracket for an expansion card slot in accordance with a preferred embodiment of the present invention, together with a connector and a rear panel of a computer enclosure.
Figure 2:
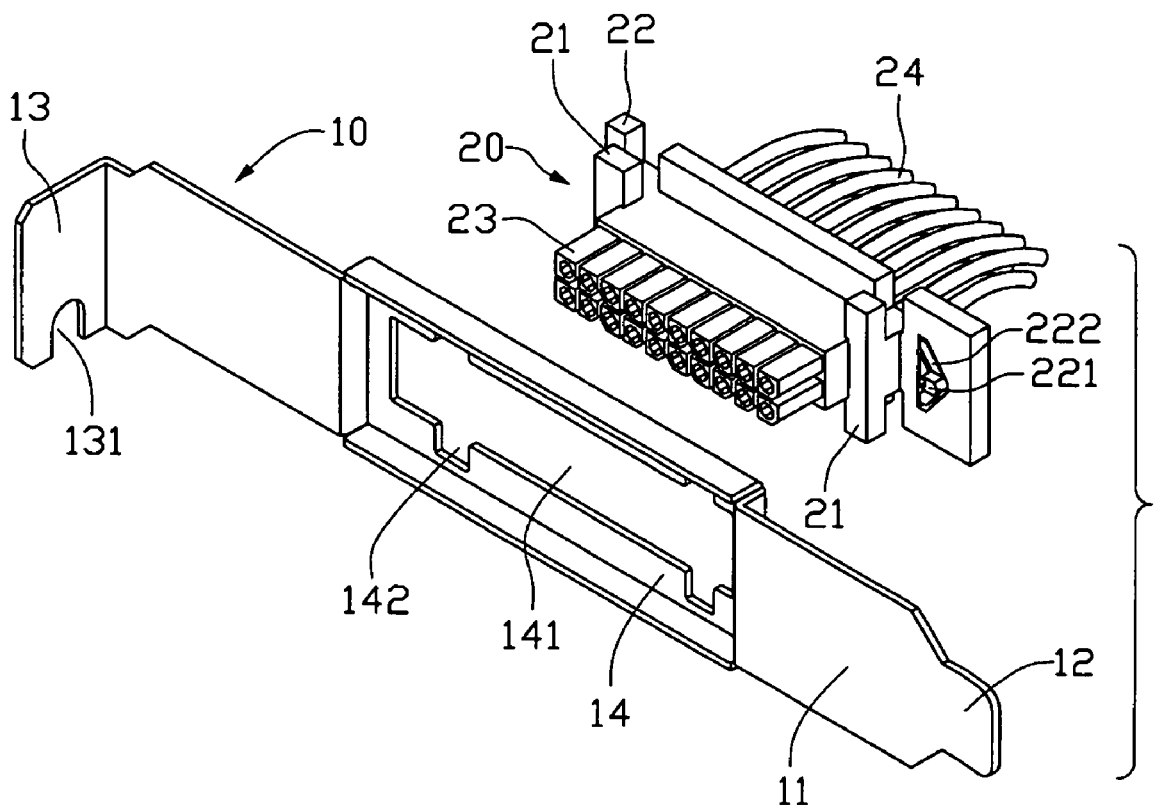
FIG. 2 is an exploded, isometric view of the bracket and the connector of FIG. 1, but viewed from another aspect.

Referring to FIGS. 1 and 2, in a preferred embodiment of the invention, a bracket is provided for mounting a connector 20 of an expansion card to a rear panel 30 of an enclosure of an electronic device like a computer.

The bracket 10 includes a rectangular main portion 11, an inserting portion 12, a securing portion 13, and a connecting portion 14. The inserting portion 12 extends coplanar from one end of the main portion 11. The securing portion 13 is bent perpendicularly outwardly from another end of the main portion 11. The securing portion 13 defines a notch 131 therein. The connecting portion 14 recesses inwardly from a middle of the main portion 11. The connecting portion 14 defines a rectangular latching opening 141 in a middle thereof. Two pairs of locating holes 142 are respectively defined in two ends of the latching opening 141. Each pair of locating holes 142 is respectively located at upper and lower edges of the latching opening 141. The locating holes 142 and the latching opening 141 cooperatively form a double-cross shape that is similar with the connector 20.

The connector 20 used as a connective apparatus includes a plug 23 at an outside thereof used for a connective interface thereof, a cable 24 at an inner side thereof, and a pair of first latching portions 21 and a pair of second latching portions 22 at two ends thereof. The first latching portions 21 are respectively arranged at two opposite sides of the plug 23, and the second latching portions 22 are respectively arranged at two opposite sides of the cable 24. A protrusion 221 is connected to one of the second latching portions 22 by two elastic portions 222. The protrusion 221 projects out from the elastic portions 222 in a direction that the plug 23 extends.

The rear panel 30 includes a supporting portion 32 bent perpendicularly outwardly from one side thereof, and a plurality of expansion card slots 31 defined in the rear panel 30 and partly in the supporting portion 32. A plurality of threaded holes 33 is respectively defined in the supporting portion 32 and in the vicinity of a corresponding expansion card slot 31. A plurality of engaging portions 34 is respectively formed from the rear panel 30 at the corresponding expansion card slot 34.

Figure 3:
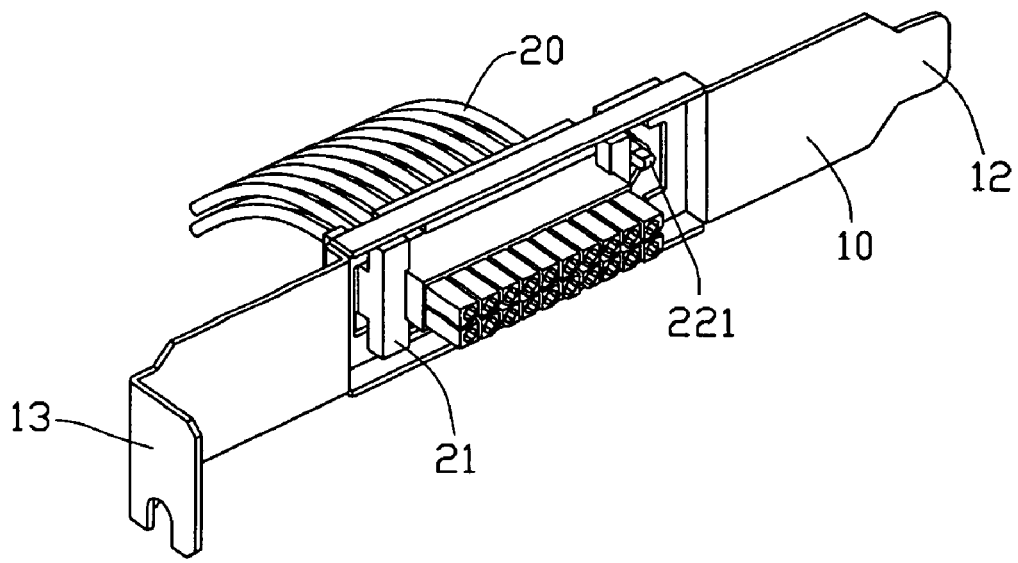
FIGS. 3 and 4 are assembled views of FIG. 2 viewed from another aspect, in different work states.

Referring to FIG. 3, in assembly, the second latching portion 22 with the protrusion 221 is resiliently bent away from the bracket 10, in order that the first latching portions 21 can go through the locating holes 142 of the bracket 10 and the plug 23 can go through the latching opening 141 of the bracket 10. Then the connector 20 is pushed horizontally toward the securing portion 13 of the bracket 10 until the first latching portions 21 are staggered with the locating holes 142. The protrusion 221 is restored and accommodated in the latching opening 141. Thus, The connector 20 is received in the locating opening 141 of the bracket 10.

Figure 4:
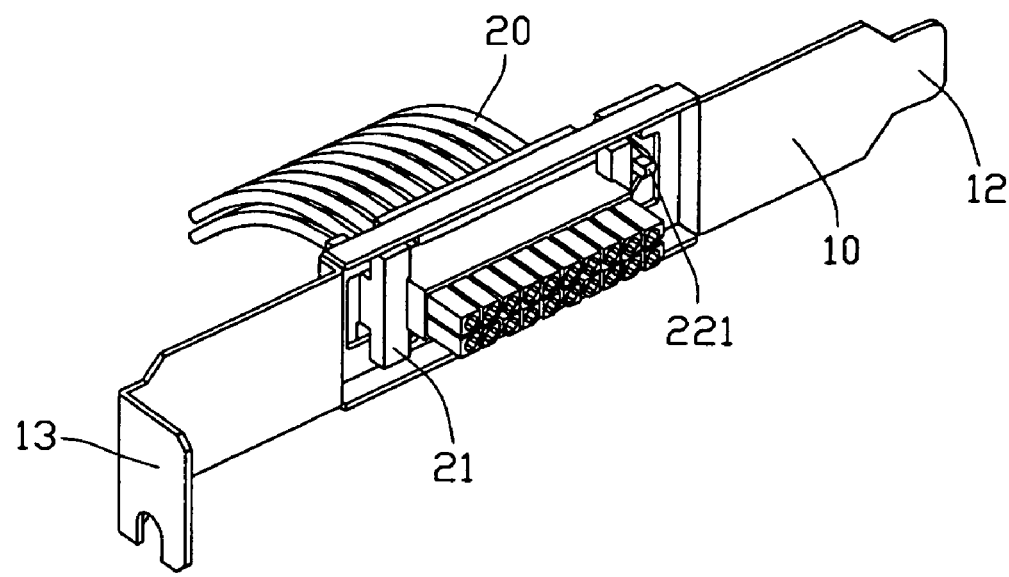

Referring to FIG. 4, the protrusion 221 is blocked the connecting portion 14, thus, the first latching portions 21 can not be moved out of the locating holes 142. Simultaneously, an upper portion and a lower portion of the connecting portion 14 are sandwiched between the first latching portions 21 and the second latching portions 22. Thus, the connector 20 is engaged in the bracket 10.

Figure 5:
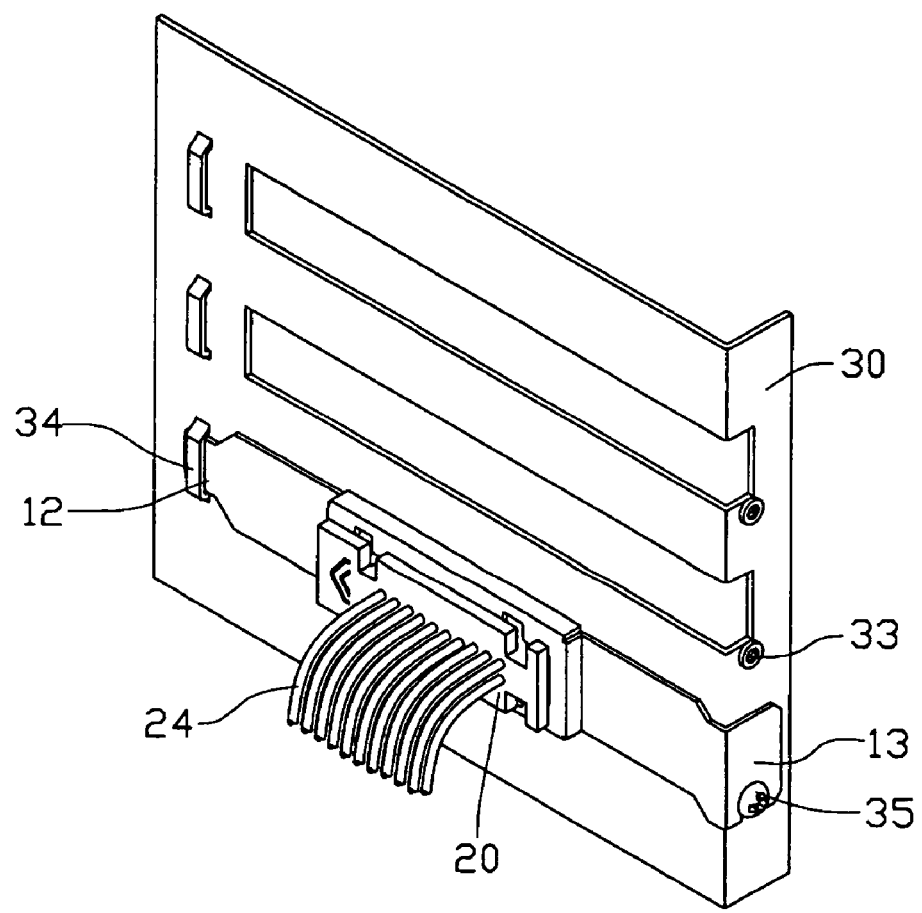
FIG. 5 is an assembled view of FIG. 1.

Referring to FIG. 5, in assembling the bracket 10 to the rear panel 30, the inserting portion 12 of the bracket 10 is inserted into the corresponding engaging portion 34 of the rear panel 30. Meanwhile, a screw 35 locks into the notch 131 of the bracket 10 and the threaded hole 33 of the supporting portion 32. Thus, the bracket 10 engaged with the connector 20 covers the expansion card slot 31 and is secured on the rear panel 30.

In disassembling the connector 20 from the bracket 10, the protrusion 221 of the connector 20 is pushed inwardly from an exterior of the rear panel 30. Then the connector 20 is moved horizontally until the first latching portions 21 are moved to align with the locating holes 142. Thus, the connector 20 can be readily removed from the latching opening 141 of the bracket 10.

It is believed that the present embodiment and its advantages will be understood from the foregoing description, and it will be apparent that various changes may be made thereto without departing from the spirit and scope of the invention or sacrificing all of its material advantages, the example hereinbefore described merely being preferred or exemplary embodiment of the invention.

I claim:

1. A bracket for mounting a connector of an expansion card to a rear panel of a computer enclosure, the bracket comprising:
    a main portion having an inserting portion formed from one end thereof;
    a securing portion perpendicularly outwardly bent from another end of the main portion, the securing portion defining a notch therein; and
    a connecting portion recessing inwardly from the main portion, the connecting portion comprising a latching opening and a locating hole communicating with the latching opening, the locating hole and the latching opening cooperatively defining a shape that is similar with the connector, for allowing the connector to extend therethrough and then offset to engage with the connecting portion.

2. The bracket as claimed in claim 1, wherein the connector comprises a plug at an outside thereof, a cable at an inner side thereof, and a pair of first latching portions and a pair of second latching portions at two ends thereof, the first latching portions are respectively arranged at two opposite sides of the plug, and the second latching portions are respectively arranged at two opposite sides of the cable.

3. The bracket claimed in claim 2, wherein a protrusion is connected to one of the second latching portions by at least one elastic portion, and the protrusion projects out from the elastic portions in a direction that the plug extends.

4. The bracket as claimed in claim 1, wherein the rear panel comprises a supporting portion bent perpendicularly outwardly from one side thereof, a plurality of expansion card slots defined in the rear panel and partly in the supporting portion, a plurality of threaded holes is respectively defined in the supporting portion and in the vicinity of a corresponding expansion card slot, and a plurality of engaging portions is respectively formed from the rear panel at the corresponding expansion card slot.

5. A bracket assembly adapted for mounted on an expansion card slot of a rear panel, the bracket assembly comprising:
    a connector comprising a plug at an outside thereof, a cable at an inner side thereof, a first latching portion arranged at one side of the plug, a second latching portion arranged at one side of the cable, the second latching portion spaced apart from the first latching portion in a direction perpendicular to the connector; and
    a bracket comprising a main portion, a connecting portion recessing inwardly from the main portion, the connecting portion comprising a latching opening and a locating hole communicating with the latching opening, the first latching portion and the plug of the connector extending through the latching opening and the locating hole, and then moving in a direction parallel with the connecting portion to sandwich the connecting portion cooperating with the second latching portion.

6. The bracket assembly as claimed in claim 5, wherein the locating hole and the latching opening cooperatively defining a shape similar with the connector.

7. The bracket assembly as claimed in claim 5, wherein a protrusion is connected to the second latching portion by at least one elastic portions, and the protrusion is accommodated in the latching opening and is blocked by the connecting portion of the bracket.

8. The bracket assembly as claimed in claim 5, wherein the bracket further comprises an inserting portion extending from one end of the main portion, and a securing portion perpendicularly bent from another end of the main portion.

9. An electronic device comprising:
    an enclosure of said electronic device defining a panel, said panel comprising at least one slot therein;
    a connective apparatus installable in said enclosure, said connective apparatus defining a connective interface thereon so as to provide a signal connection between said electronic device and other devices outside said enclosure via said connective interface, at least one latching portion extending out of said connective apparatus next to said connective interface; and
    a bracket removably attachable to said panel so as to substantially cover said at least one slot of said panel, said bracket defining an opening therein, said opening configured to have a shape of exposing said connective interface and said at least one latching portion to said other devices, allowing exclusive passage of said connective interface and said at least one latching portion through said opening and allowing lateral movement of said connective interface and said at least one latching portion along said bracket, wherein said connective apparatus further comprises another latching portion extending out apart from said connective interface and said at least one latching portion, a space is defined between said at least one latching portion and said another latching portion, a portion of said bracket bounding said opening is received in said space of said connective apparatus.

10. The electronic device as claimed in claim 9, wherein said bracket comprises a main portion and a connecting portion offset from said main portion away from said panel into said enclosure, said opening of said bracket is defined in said connecting portion.

11. The electronic device as claimed in claim 9, wherein an engaging portion is defined on said panel around said at least one slot of said panel so as to confine movement of at least one end of said bracket when said bracket is attached against said panel to cover said at least one slot.

* * * * *